March 1, 1927. 1,619,035
A. RAFTER
SHOCK ABSORBER
Filed Dec. 15, 1922
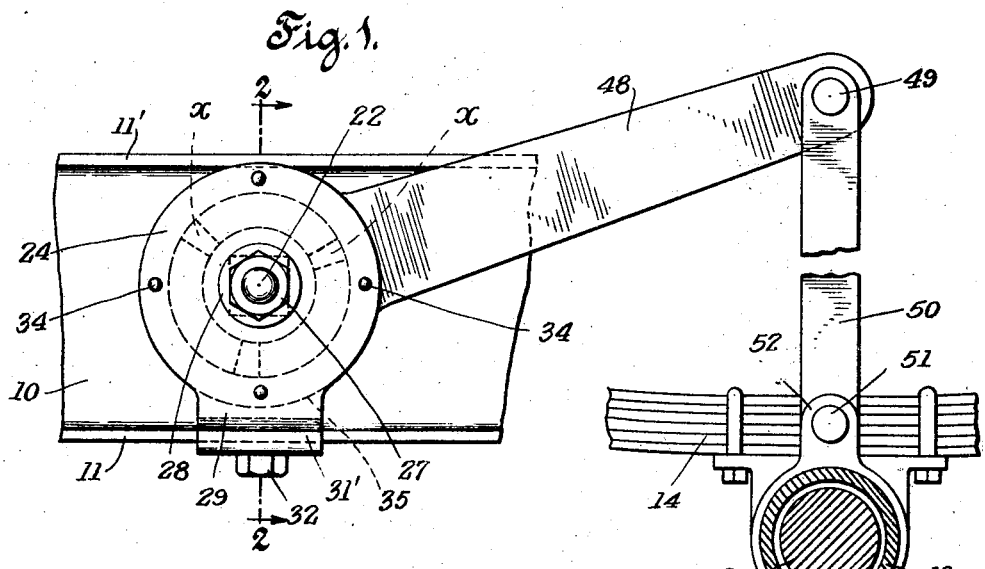
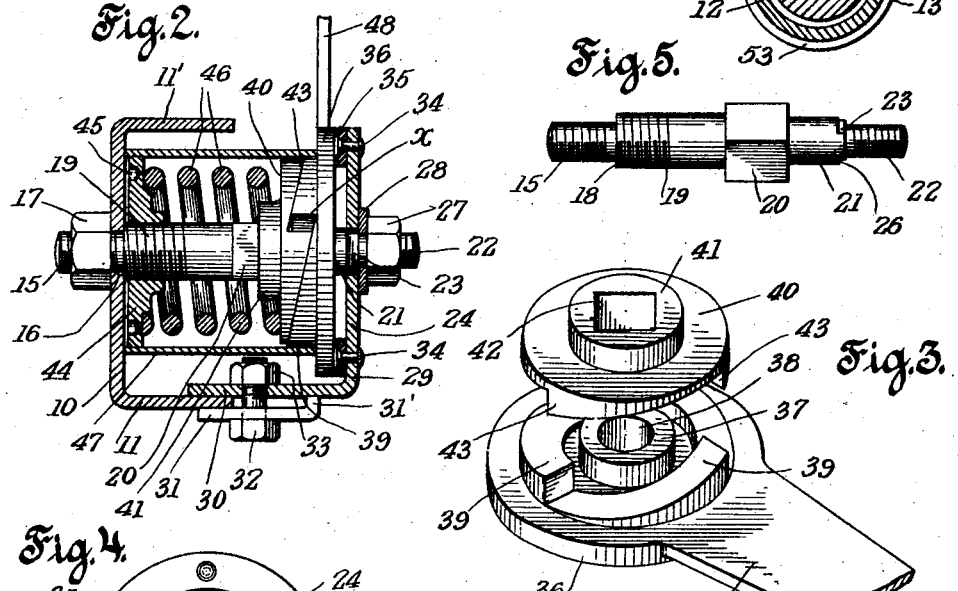
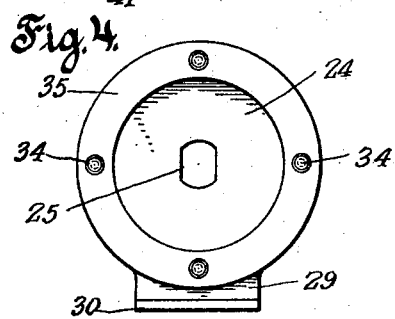
INVENTOR
Albert Rafter
BY Fredk C Fischer
ATTORNEY Patented Mar. 1, 1927.

1,619,035

UNITED STATES PATENT OFFICE.

ALBERT RAFTER, OF NEWARK, NEW JERSEY, ASSIGNOR TO RAFTER MACHINE COMPANY, OF NEWARK, NEW JERSEY, A PARTNERSHIP COMPRISING JOHN RAFTER, ALBERT RAFTER, AND JOHN C. RAFTER.

SHOCK ABSORBER.

Application filed December 15, 1922. Serial No. 607,025.

This invention relates to improvements in devices for opposing yieldable resistance to bodies acting by their own inertia, and particularly as applied to the suspension apparatus of vehicle bodies as subjected to shocks caused by inequalities of the surface travelled upon.

One of the objects is to provide means for relieving the usual support springs of the body from much of the shock and strain so encountered and to minimize the rebound and oscillation otherwise imparted.

Another purpose is to produce a shock absorbing device that can be adjusted to accommodate varying weights of car bodies, loads and conditions.

A further aim is to introduce into the device friction elements arranged to operate under rapidly accumulating tension when moving in one direction and correspondingly decrease the tension upon moving reversely.

These several aims, objects and purposes, together with others which will hereinafter become apparent, are accomplished by the novel construction and arrangement of parts hereinafter described and shown in the accompanying drawing, forming a material part of this disclosure, and in which:—

Figure 1 is a side elevational view of an embodiment of the invention, illustrating its application.

Figure 2 is a sectional view taken approximately on line 2—2 of Figure 1.

Figure 3 is a perspective view of the cam details arranged in their respective relation.

Figure 4 is a side view of the bracket and friction ring in detail.

Figure 5 is a side view of the spindle in detail.

In the drawing one of the longitudinal channel elements of the chassis frame is designated by the numeral 10, having flanges 11 and 11', the axle of the vehicle 12, the transmission housing 13 and the spring 14 as interposed between the axle and chassis frame, these several parts being shown merely to illustrate the application of the invention.

The device is attached to the channel 10, midway between the flanges 11 by a stud or spindle which, as shown in Figure 4, has a reduced screw-threaded end portion 15 passing through an opening 16 in the channel and fitted with a nut 17 by which the shoulder 18 is drawn tightly against its inner side.

Adjacent the shoulder is a larger diametered portion 19, also screw-threaded, adjoining a squared portion 20, the width of the side of which at least equals the diameter of the portion 19, the stud having a reduced plain cylindrical portion 21, further reduced and screw-threaded as at 22, and provided with a short intermediate portion 23 flattened upon opposite sides to the diameter of the end portion 22.

A plate 24, mainly circular in outline is provided with an opening 25 suited to snugly engage the flattened portion 23 of the stud and is rigidly held against the shoulder 26 on the stud by a nut 27 suited to the end 22, a washer 28 being interposed.

An extension 29 from the edge of the plate 24 leads to a right angled pad element 30 adapted to engage the inner side of the lower flange of the frame channel 11 being held firmly thereagainst by a clip 31 having an offset portion 31' and clamped by a bolt 32 passing through the clip and pad 30 adjacent the edge of the flange to securely grip the same, the bolt having a nut 33 seated against the inner side of the pad as shown, said plate and pad constituting a bracket.

Secured at spaced intervals on the inner face of the plate 24, by rivets 34, is a ring 35 of fibre or like material and adjacent the ring is a disc 36 having a hub 37 on its opposite side and containing an opening 38 suited to move freely on the section 21 of the stud.

Formed on the face of the disc 36, concentrically spaced from the hub 37, are a series of cams 39, three being shown, each presenting a segment having its face formed in the manner of the convolution of a coarse triple square screw-thread, the three faces being uniform and alike in pitch, inclination and height.

Another disc 40, of slightly lesser diameter, is provided with a hub 41 containing a square axial opening 42 suited to slidably engage the stud portion 20, and formed on its face adjacent the disc 36 are cam elements 43, the same being similar and complementary to the cams 39 before described, it being noted that in assembling the structure the cams are so arranged relatively that spaces, as at X exist between the abutments or step at the beginning of each partial convolution.

Adjustably engaged on the stud portion 19 is a hubbed disc 44 having in its outer face blind openings 45 to receive a spanner or like wrench by which the disc can be turned relative to the stud.

A strong helically wound spring 46 encircles the stud and abuts the adjacent sides of the discs 40 and 44, the effect being to press the cams 43 into resilient engagement with the mating cams 39.

A tubular casing 47, tight fitting the circumferences of the disc 44 and cams 39 extends between the inner surface of the channel 10 and disc 36, acting as a guard and also as a container for grease for lubricating the cams and other movable parts.

Extending rigidly from the edge of the disc 36 is a bar lever 48 of appropriate length, its outer end having a pivot 49 by which is engaged a connecting rod or link 50 pivoted in turn as at 51 to a lug 52 formed on the bracket 53 fixed to the casing 13.

In operation, the parts having been assembled as indicated, it being understood that the shock absorbers are used in pairs, if the vertical distance between the frame 10 and axle 12 be increased, due to sudden rebound of the spring 14, the lever 48 by reasons of its connections, will be drawn down, communicating a partial rotary motion to the disc 36.

As said disc is held tightly against the friction ring 35 by the compressed spring 46, acting through the medium of the cams, a powerful resistance is encountered which may be adjusted by turning the disc 44 to adjust the spring action.

Moreover, the effort of the spring 46 is automatically increased as the lever is moved down, due to the action of the cams, the same causing the disc 40 to move upon the squared section of the stud to compress the spring in accordance with the movement of the lever.

It is also to be noted that upon releasing the pull on the lever, it will be returned to its normal position with very little effort, the inclination of the cam surfaces being such as to render raising of the lever comparatively easy, releasing as they do much of the pressure of the disc against the friction ring.

Although the foregoing is descriptive of the preferred embodiment of the invention, it will be apparent that minor changes may be made in its construction, without the exercise of invention or conflicting with the scope of the claim hereto appended.

Having thus described my invention, what I claim as new and desire to secure by Letters Patent, is:—

In a shock absorber, the combination with an axle having elliptic springs and a chassis frame supported by the springs, said axle provided with a housing, of a bracket fixed on said springs to engage said housing, a raised lug on said bracket, a link pivoted in the lug to extend substantially upright above said chassis frame, a lever pivoted to said link, said lever having a disc, a bolt fixed in said frame on which the lever disc is pivoted, a housing clamped by said bolt to the frame, a friction ring fixed on the outer wall of said housing to contact with said disc, a plurality of cams on the inner face of the disc, a collar provided with a square opening and having complementary cams, said collar being slidable on a squared section of said bolt, a spring urging said collar towards the disc, means on said bolt to adjust the pressure of said spring, and a tubular casing interposed between said disc and frame to enclose all of said cams, the spring and its adjusting means.

This specification signed and witnessed this 13th day of December, 1922.

ALBERT RAFTER.